United States Patent [19]
Vandermeer

[11] 3,840,285
[45] Oct. 8, 1974

[54] AUTOMOTIVE REFLECTION DISTRESS SIGNAL

[76] Inventor: Jacob Vandermeer, 662 Lake Dr., S.E., Grand Rapids, Mich. 49503

[22] Filed: Jan. 26, 1973

[21] Appl. No.: 327,197

[52] U.S. Cl. .................................. 350/97, 40/129 C
[51] Int. Cl. .............................................. G02b 5/12
[58] Field of Search .......... 40/129 R, 129 A, 129 C, 40/125 H; 116/28, 63 P; 350/97

[56] References Cited
UNITED STATES PATENTS

| | | | |
|---|---|---|---|
| 1,987,863 | 1/1935 | Murphy | 40/130 J |
| 2,887,983 | 5/1959 | Budd | 116/63 P |
| 3,024,552 | 3/1962 | MacLea | 40/129 C |
| 3,703,152 | 11/1972 | Morton | 40/129 C |
| 3,762,360 | 10/1973 | Hawes | 40/129 C |

FOREIGN PATENTS OR APPLICATIONS

| | | | |
|---|---|---|---|
| 588,328 | 12/1959 | Canada | 40/125 H |

Primary Examiner—Ronald L. Wibert
Attorney, Agent, or Firm—Price, Heneveld, Huizenga & Cooper

[57] ABSTRACT

An emergency signal device for use by an automotive vehicle, and which would serve to attract attention for help from passing vehicles in case a car is broken down so that it cannot continue to travel; the device consisting of a collapsible frame on which the word "Help" is readily visible, the frame being integral with a clip that is attachable over the upper edge of a vehicle window.

3 Claims, 3 Drawing Figures

PATENTED OCT 8 1974　3,840,285
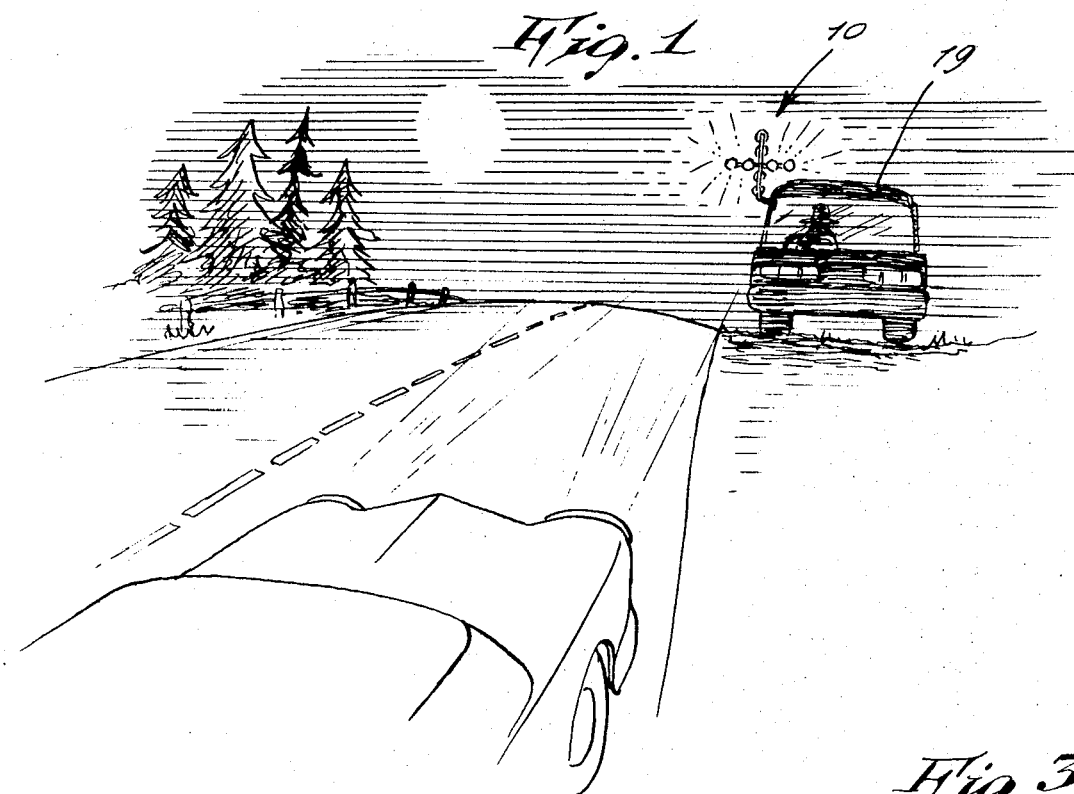
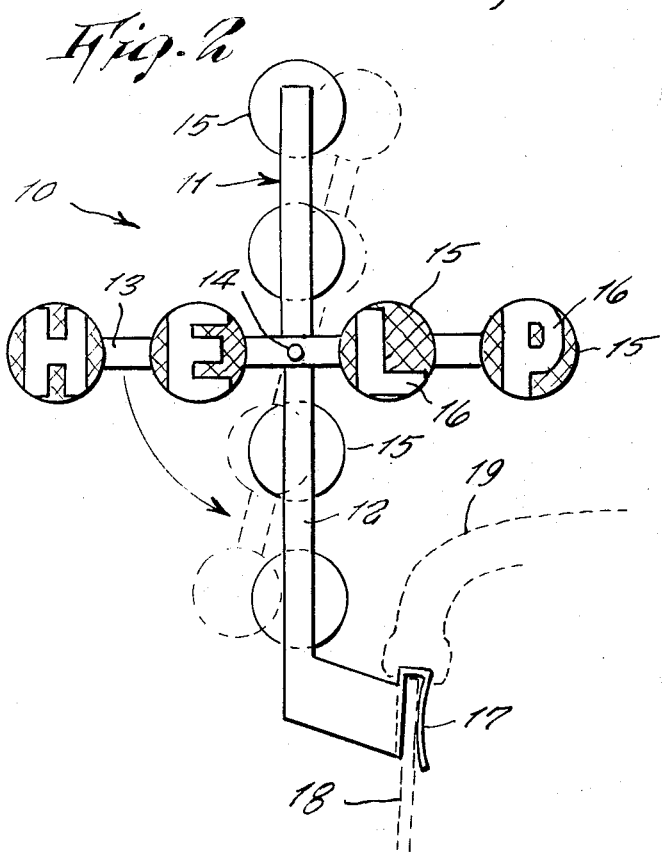
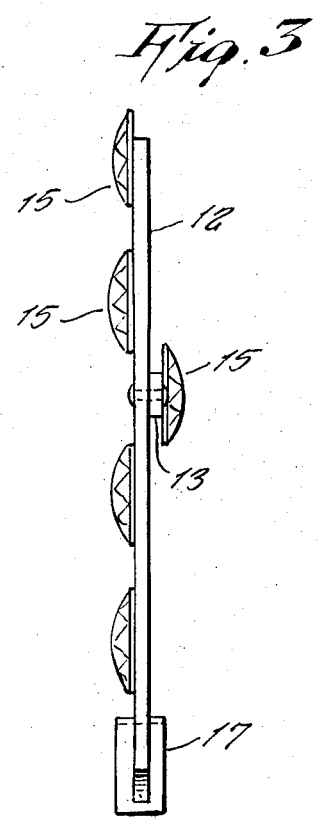

AUTOMOTIVE REFLECTION DISTRESS SIGNAL

This invention relates generally to automotive accessories. More specifically, it relates to automobile signalling devices.

It is generally well known that an automotive vehicle can break down on a highway in regions where no help exists, so a motorist must rely on assistance by passing vehicles who must be flagged down, and which can be possibly dangerous if persons who stop appear to be of questionable character. This situation is objectionable and therefore in want of an improvement.

Accordingly, it is a principal object of the present invention to provide a signal device that is readily mountable on a car in distress for attracting assistance and which allows the person to stay inside his locked car until he feels certain that a stopping person appears to be trusted against inflicting any harm.

Another object is to provide a distress signal device which accordingly would be ideal for use by women motorists particularly when traveling at night and across lonely or desolate regions.

Another object is to provide a distress signal device which can be seen at night time or in day.

Yet another object is to provide an automotive reflection distress signal which can be readily folded when not in use so to fit inside the car in any handy out-of-the-way place such as under a driver's seat where it can be conveniently reached by the motorists when needed, and which in use can be clipped on a window upper edge for visibility to others, and the window then rolled up closed for security, or prevent rain or cold to enter the car.

Other objecs are to provide an automotive reflection distress signal which is simple in design, inexpensive to manufacture, rugged in construction, easy to use, and efficient in operation.

These and other objects will be readily evident upon a study of the following specification and the accompanying drawing, wherein:

FIG. 1 is a view of the present invention in operative use on a car in distress.

FIG. 2 is a front view of the invention.

FIG. 3 is a side view thereof.

Referring now to the drawing in detail, the reference numeral 10 represents an automotive reflection distress signal according to the present invention wherein there is a frame 11 comprised of two straight bars 12 and 13 that cross each other and are pivotally attached together at their centers by a rivet 14 so that they can be pivoted in front of each other for being stored away, as shown by the dotted lines in FIG. 2, or which can be spread out in a cross arrangement for operative use, as shown by the solid lines in the same figure.

Each bar has a series of reflectors 15 mounted on one side thereof so that light from a passing automobile head lights can be picked up and reflected on them back to the passing motorist.

Each reflector can have an alphabetic letter 16 formed thereupon so that the letters together read the word "Help," or alternately they may be made to read any other desired distress word. As shown in FIG. 2, one of the bars may have the reflectors facing for being read in one direction, while the other bar has the reflectors facing the other direction, so that passing motorists from both directions can be signalled.

One of the bars 11 forms a vertical member of the frame, and the lower end of the bar 11 has a clip 17 integral therewith for clipping over the upper edge of an automobile window glass 18, after which the window is rolled up closed.

In operative use, the distress signal thus extends upwardly so that it is higher than a car 19 where it can be more easily seen.

Thus a distress signal is provided that would be useful if a car breaks down such as by a flat tire or running out of gas, and it is necessary to pull over to a side of the road and ask for help. The present invention allows a person to stay in the locked car and see the individual offering assistance before rolling down the window or getting out of the car.

I claim:

1. A reflective distress signal apparatus for automobiles and other vehicles comprising a collapsible frame for supporting a plurality of reflectors thereon and U-shaped means integral with said frame for removably securing said frame to a side window of such a vehicle; said frame including an upstanding, generally vertical first support member having a first length, two ends, and a midpoint halfway between said ends, a second support member of a predetermined length, two ends and a midpoint halfway between said ends, secureing means for pivotally securing the midpoint of said first support member to the midpoint of said second support member such that said second support member is pivotable between a collapsed, storage position in which said second support member is aligned parallel to said first support member and an erect position in which said second support member is generally horizontal and perpendicular to said first support member with substantially one-half the length of said second support member on either side of said first support member; a plurality of individual reflectors secured to said frame, a portion of said reflectors secured to said first support member and facing away from said second support member, the remainder of said reflectors secured to said second support member facing away from said first support member and positioned in equal portions on either side of said midpoint of said second member for balancing and maintaining said second support member in said erect position without the aid of additional support means whereby said reflectors are visible and reflect light from opposite directions when said apparatus is mounted on a vehicle.

2. The apparatus of claim 1 wherein said means for removably securing said frame to an upper edge of a vehicular side window include means for supporting said frame and reflectors generally above the level of the roof of the vehicle comprising a support arm extending downwardly at an angle from one end of said first support member, and said U-shaped means comprising a U-shaped clip member at the lower end of said support arm for fitting over the upper edge of the vehicle side window.

3. The apparatus of claim 1 wherein said reflectors on said second support member each including indicia thereon, said reflectors being arranged on said second support member to spell out a word or message indicating distress to persons passing the vehicle on which said signal is mounted; said word or message being readable when sid second support member is in said erect position and being unreadable when said second support member is in said collapsed storage position.

* * * * *